United States Patent
Kanayama

(10) Patent No.: US 6,769,614 B2
(45) Date of Patent: Aug. 3, 2004

(54) MAGNETIC CARD READER

(75) Inventor: Yasuhiro Kanayama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 10/129,643

(22) PCT Filed: Aug. 24, 2001

(86) PCT No.: PCT/JP01/07270
§ 371 (c)(1),
(2), (4) Date: Aug. 7, 2002

(87) PCT Pub. No.: WO02/21516
PCT Pub. Date: Mar. 14, 2002

(65) Prior Publication Data
US 2003/0089773 A1 May 15, 2003

(30) Foreign Application Priority Data
Sep. 6, 2000 (JP) ........................................ 2000-269815

(51) Int. Cl.[7] ................................................ G06K 7/08
(52) U.S. Cl. ...................................... 235/449; 235/435
(58) Field of Search ................................. 235/449, 435

(56) References Cited

U.S. PATENT DOCUMENTS 4,603,261 A * 7/1986 Robertson et al. .......... 250/566
5,362,951 A * 11/1994 Kanazawa et al. .......... 235/449

FOREIGN PATENT DOCUMENTS

| JP | 1-196765 | 8/1989 |
|---|---|---|
| JP | 2-65210 | 5/1990 |
| JP | 9-63023 | 3/1997 |
| JP | 2000-149208 | 5/2000 |

OTHER PUBLICATIONS

International Serach Report corresponding to application No. PCT/JP01/07270 dated Nov. 27, 2001.

English translation of Form PCT/ISA/210.

* cited by examiner

Primary Examiner—Diane I. Lee
Assistant Examiner—Lisa M. Caputo
(74) Attorney, Agent, or Firm—RatnerPrestia

(57) ABSTRACT

A magnetic card reader reduces the height of a magnetic head mechanism, includes a few parts, is assembled easily, and is inexpensive. The card reader includes an upper case provided with a magnetic head mounting hole and a wire spring groove for a magnetic head to move smoothly vertically, a magnetic head support mechanism, and a lower case. The magnetic head support mechanism includes a magnetic head support member, the magnetic head, and a wire spring.

9 Claims, 9 Drawing Sheets

MAGNETIC CARD READER

THIS APPLICATION IS A U.S. NATIONAL PHASE APPLICATION OF PCT INTERNATIONAL APPLICATION PCT/JP01/07270.

TECHNICAL FIELD

The present invention relates to a magnetic card reader for recording and reading data on a magnetic card provided with a magnetic stripe.

BACKGROUND ART

A conventional magnetic card reader includes, as shown in FIG. 8, an upper case 1 having a card guide 1a for a magnetic card 12, a lower case 2, a card inlet port 3 for accepting the magnetic card 12, a magnetic head support mechanism 14 which is disposed on top of the upper case 1 near the end of the card inlet port and reads data out of the magnetic card 12, and a spring holder 10 with a wire spring 6 abutted thereon. The magnetic head support mechanism 14 includes a magnetic head support member 4 with a magnetic head 5 press-fitted therein, and the wire spring 6 substantially U-shaped to apply a force to the member.

The conventional card reader is assembled in the following manner. As shown in FIG. 9, the head support mechanism 14 is disposed from above the upper case 1 into a magnetic head mounting hole 1b formed in the upper case 1 and also fitted in spring positioning grooves made in boss-like projections at each side of the magnetic head mounting hole 1b. The spring holder 10 is secured by spring holder retaining hooks 11 disposed on the upper case 1 in order to hold both ends of the wire spring 6 protruded from the head support mechanism 14.

In the conventional card reader with the head support mechanism 14 mounted thereon, when the magnetic card 12 is inserted into the card guide 1a, the magnetic head 5 is pressed against the magnetic card 12 by force F of the wire spring 6 on the magnetic head support member 4, thereby reading data on the magnetic stripe. Next, the data on the magnetic card 12 enters into a printed circuit board 7 via a head cable 8 and is transmitted to a host computer.

In the conventional magnetic card reader, the magnetic head support member 4, the spring holder 10, and the spring holder retaining hook 11 are placed on top of the upper case 1 in this order, and then the total height of these members causes the head support mechanism 14 to protrude from the upper case.

In order to lower the height position of the magnetic head support mechanism 14, the upper case 1 can have a space formed therein for accommodating the magnetic head support mechanism 14. However, the space reduces rigidity of the upper case 1 and affecting the reading performance.

The recent market requires a thinner magnetic head support mechanism 14 located at the end of magnetic card reader as well as for cost down for a compact, inexpensive data terminal.

Even if a thin magnetic head 5 is mounted by a conventional method for supporting the magnetic head, the spring mechanism for supporting the magnetic head cannot be lowered in height, and therefore eliminating a merit of the thin head.

DISCLOSURE OF THE INVENTION

A card reader includes an upper case, a lower case fitted to the upper case forming a magnetic card guide for magnetic card between the upper case, and a magnetic head to read data on the card held between the upper case and the lower case.

DESCIRPTION OF PREFERRED EMBODIMENTS (First Exemplary Embodiment)

Figure 1:
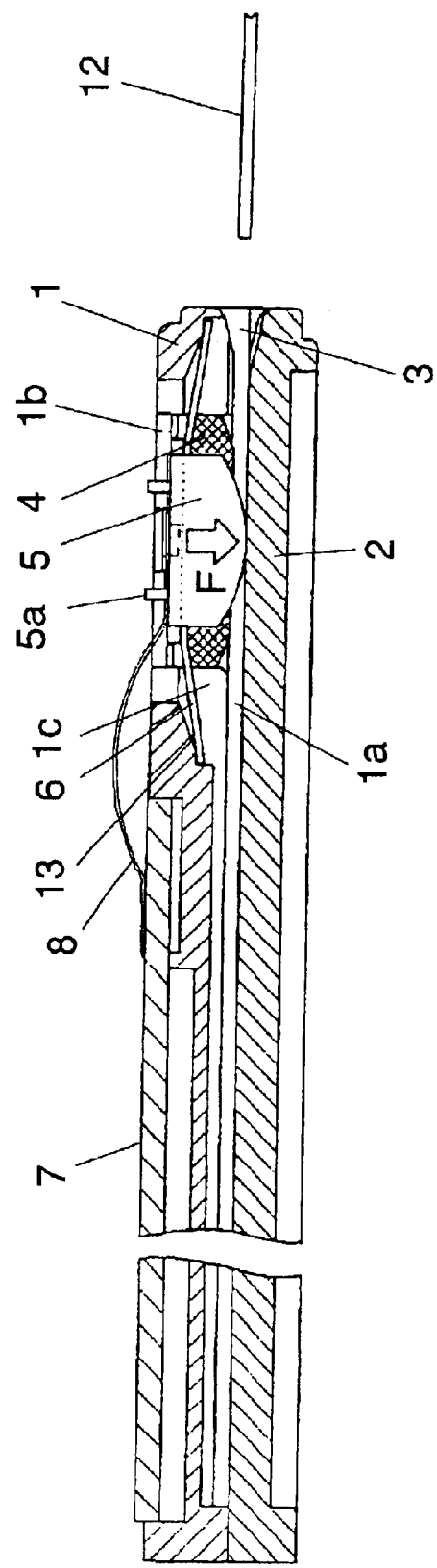
FIG. 1 is a sectional view of a card reader in a first exemplary embodiment of the present invention.
Figure 2:
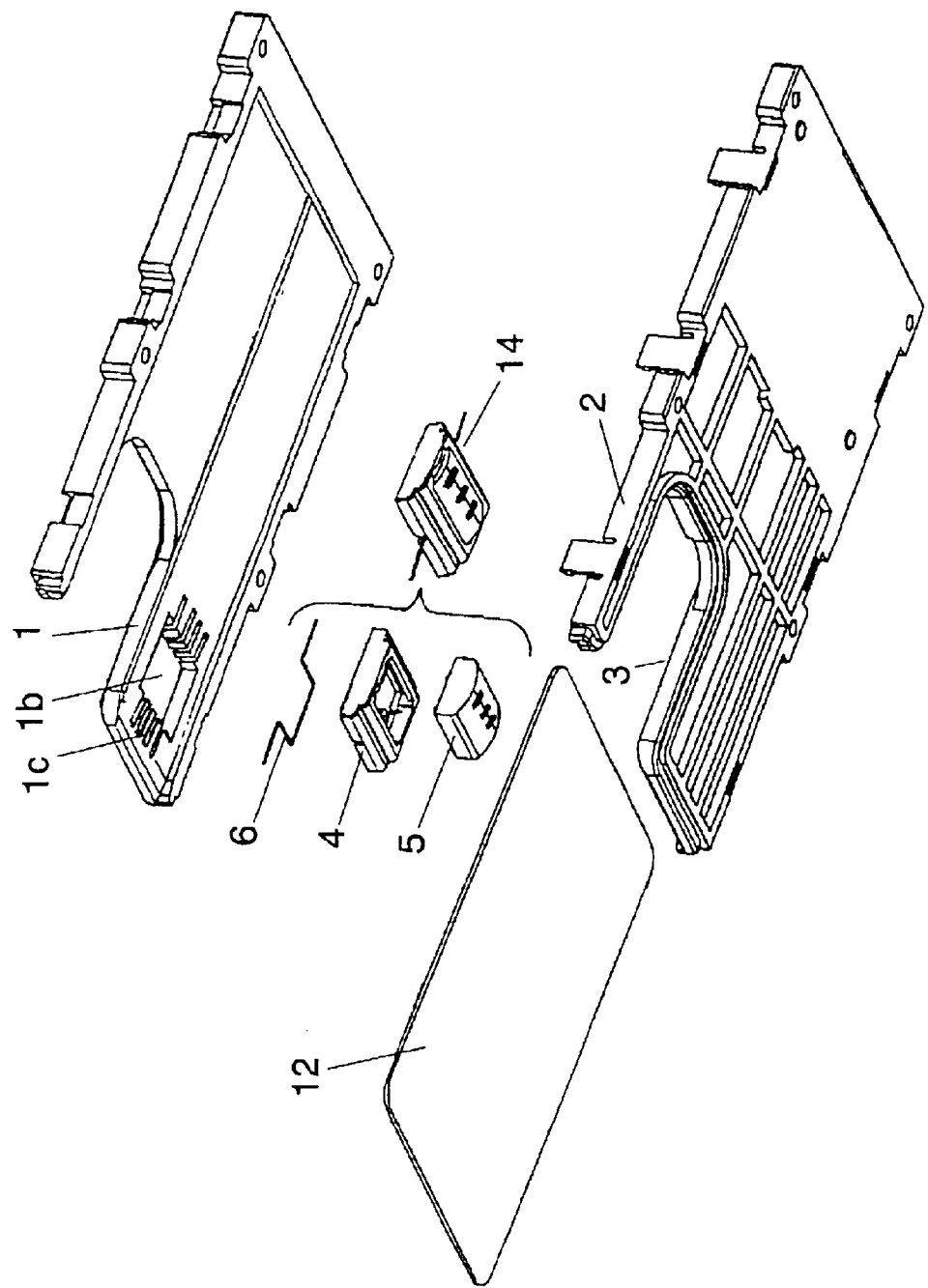
FIG. 2 is an exploded perspective view of the card reader in the first embodiment.
Figure 3:
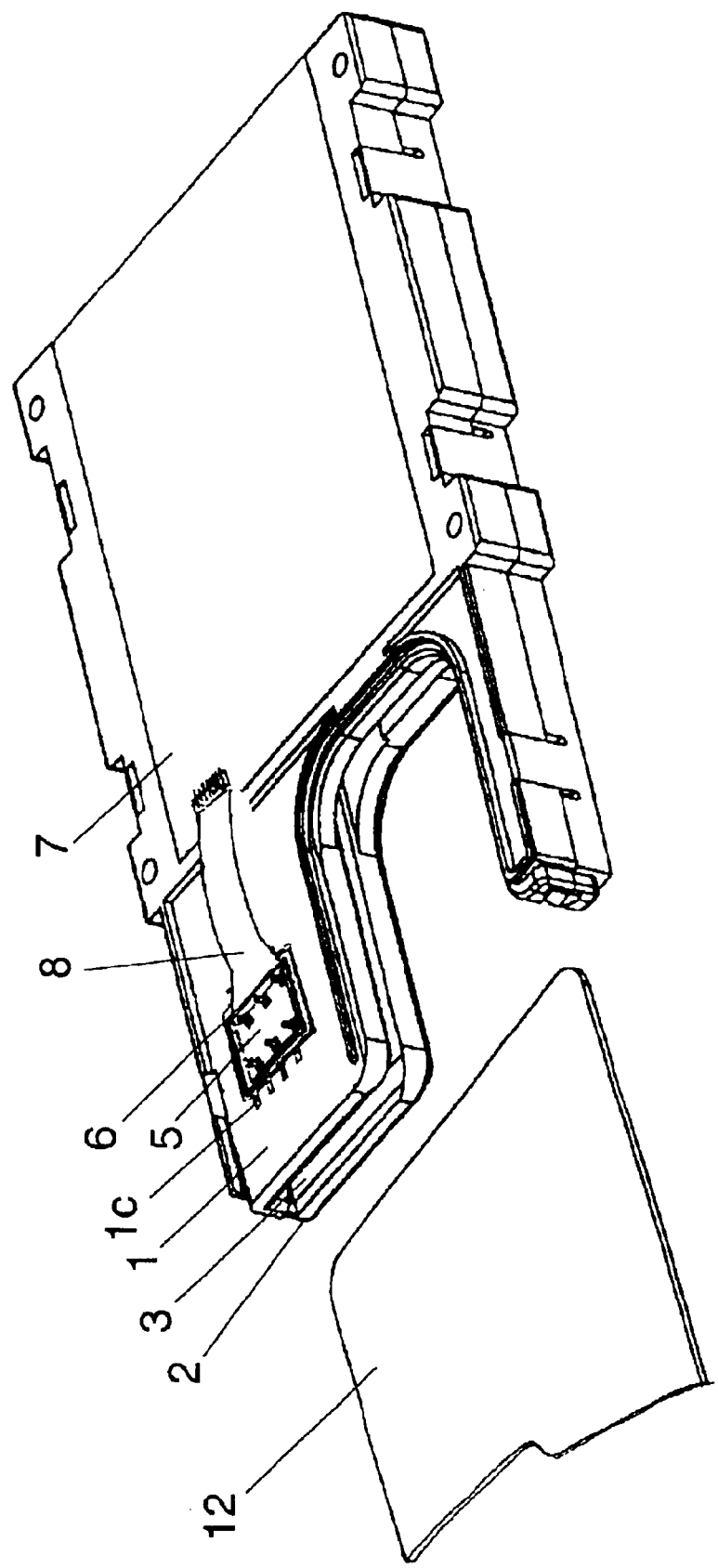
FIG. 3 is a perspective view of the card reader equipped with a magnetic head support mechanism in the first embodiment.

FIG. 1 is a sectional view of a card reader equipped with a magnetic head support mechanism in a first exemplary embodiment of the present invention. FIG. 2 is an exploded perspective view of the reader. FIG. 3 is a perspective view of the reader.

As shown in FIG. 1, the card reader includes an upper case 1, a lower case 2, an inlet port 3 for accepting a magnetic card, a magnetic head support member 4 for supporting a magnetic head, a magnetic head 5 to read a magnetic signal recorded on the card, a wire spring 6 which is inserted in side grooves of a magnetic head supporter and applies a force to the magnetic head against the card, a printed circuit board 7, and a head cable 8 for transmitting the signal read by the magnetic head 5 to the printed circuit board 7.

The upper case 1 has a card guide 1a being continuous to the inlet port 3, a magnetic head mounting hole 1b for holding the magnetic head 5 between the upper case 1 and the lower case 2, and a spring groove 1c on which the wire spring 6 is abutted. The magnetic head support mechanism 14 includes the magnetic head support member 4, the magnetic head 5 fitted thereon, and the substantially U-shaped wire spring 6.

An operation of the card reader will be described. As shown in FIG. 1 and FIG. 2, the magnetic head support mechanism 14 is inserted in the magnetic head mounting hole 1b of the upper case 1 while the wire spring 6 abuts the spring groove 1c. Then, the lower case 2 is secured to the upper case 1 with, for example, a screw. Consequently, the magnetic head 5 is securely held between the upper case 1 and the lower case 2, and a core side of the magnetic head 5 contacts with the lower case 2.

When magnetic card 12 is inserted from the inlet port 3 into the card guide 1a, the wire spring 6 is vertically moved up on a fulcrum 13 on a bottom of the groove 1c in the upper case, thereby applying a force F to the magnetic head 5. Accordingly, the magnetic head 5 contacts tightly with the magnetic stripe of the magnetic card 12 and reads the data from the card 12. The magnetic card 12, when being inserted further into the card guide 1a of the upper case 1, pushes a detector switch (not shown) installed in the back of the card guide 1a, thereby enabling a host computer to recognize that the card 12 is fully inserted into the card reader. The data read out of the magnetic card 12 enters into the printed circuit board 7 via the head cable 8 and is transmitted to the host computer.

Figure 8:
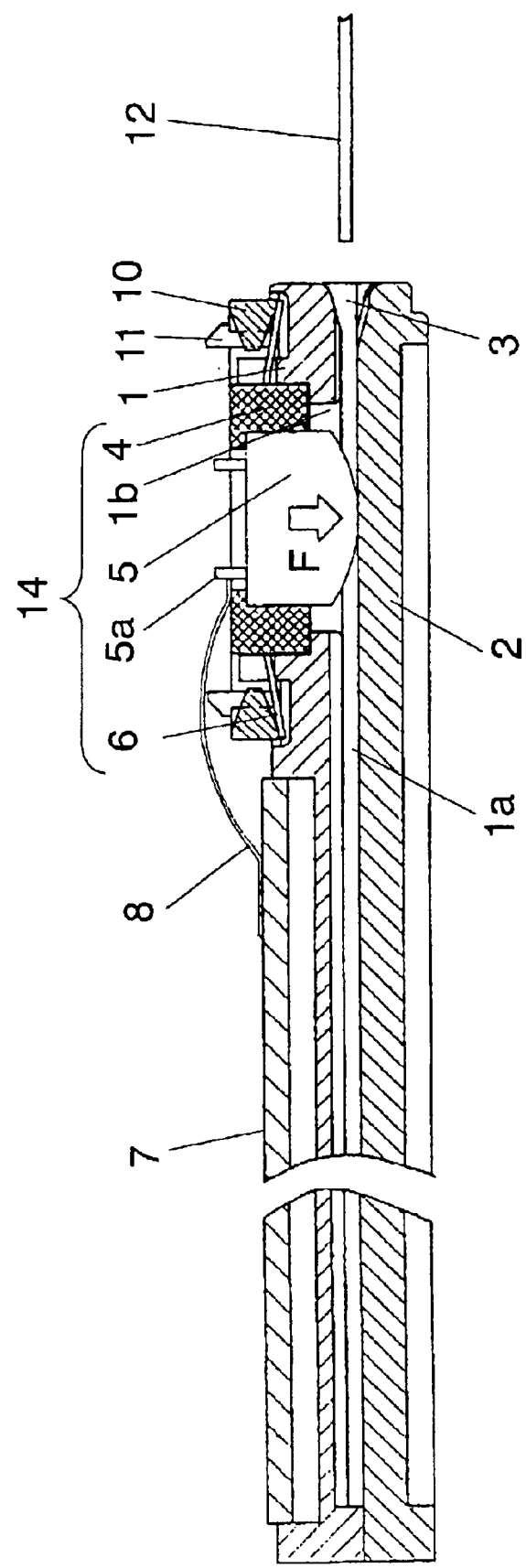
FIG. 8 is a sectional view of a conventional magnetic head support mechanism.
Figure 9:
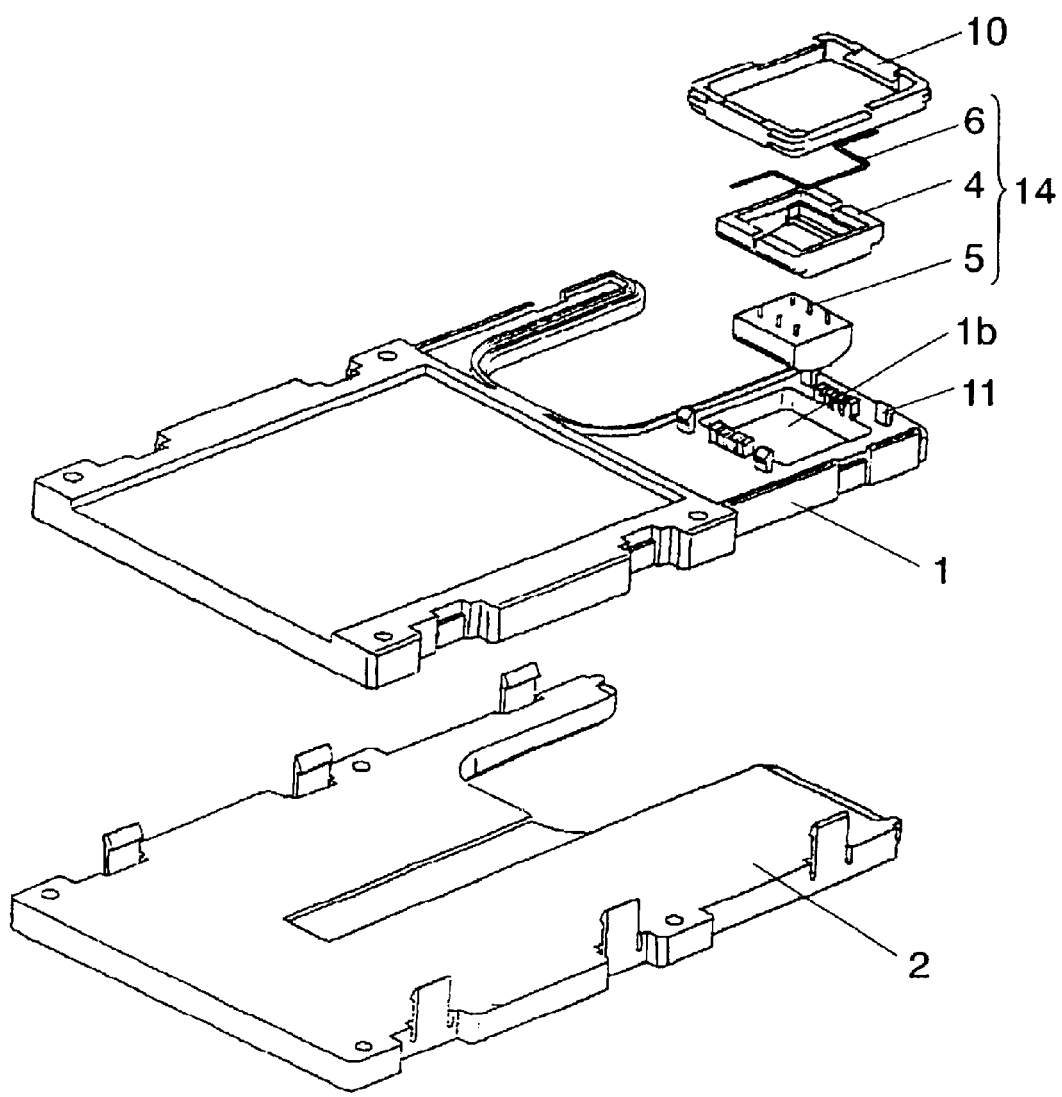
FIG. 9 is an exploded perspective view of a conventional magnetic head mechanism.

As shown in FIG. 3, in the card reader in the present embodiment, a spring holder 10 and spring holder retaining claw 11 which are included in the conventional card reader shown in FIGS. 8 and 9 functioning as a fulcrum for the wire spring 6 in head support mechanism 14 are integrally formed inside the upper case. That is, the spring groove 1c at each side of the magnetic head mounting hole 1b on the underside of the upper case are formed in the card inserting direction, and fulcrum 13 for supporting wire spring 6 of head support mechanism 14 is disposed at the end of the groove. Therefore, the head support mechanism 14 built into the upper case 1 is invisible from outside.

(Second Exemplary Embodiment)

Figure 4:
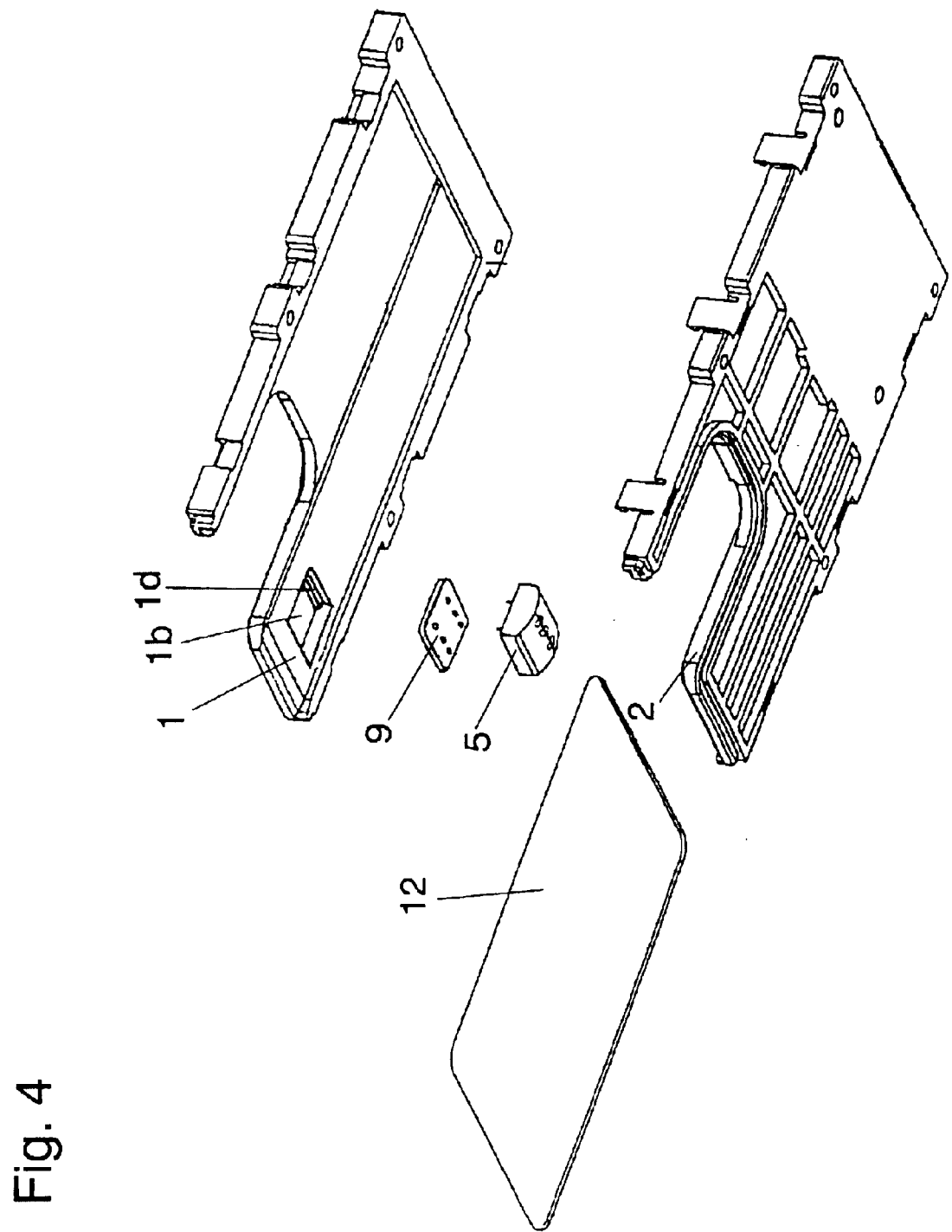
FIG. 4 is an exploded perspective view of a card reader in a second exemplary embodiment of the present invention.
Figure 5:
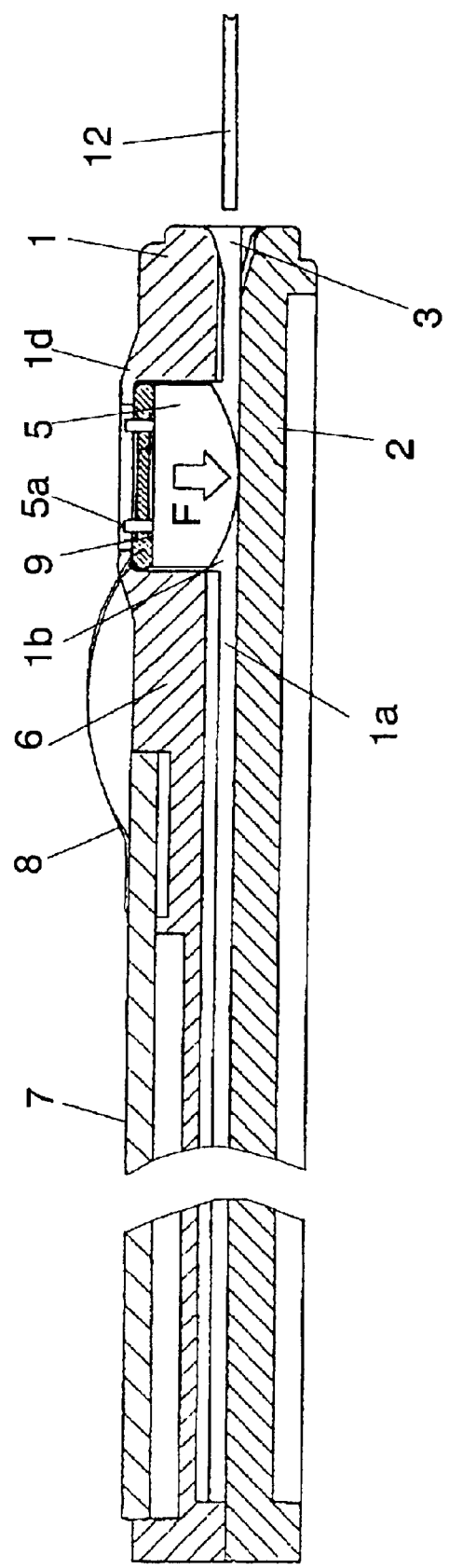
FIG. 5 is a sectional view of the card reader in the second embodiment.
Figure 6:
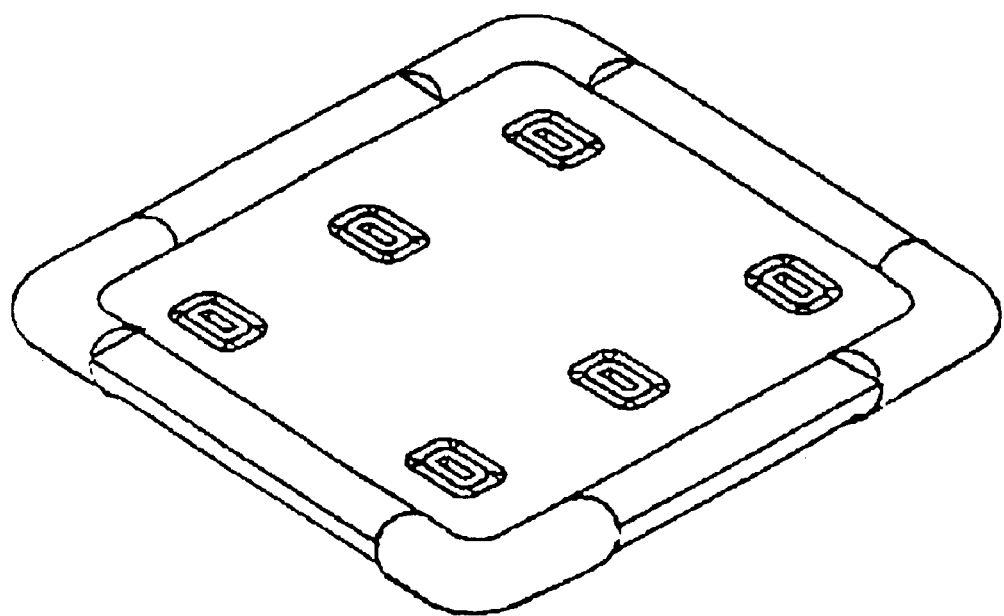
FIG. 6 is a perspective view of an elastic body of the card reader in the second embodiment.
Figure 7A:
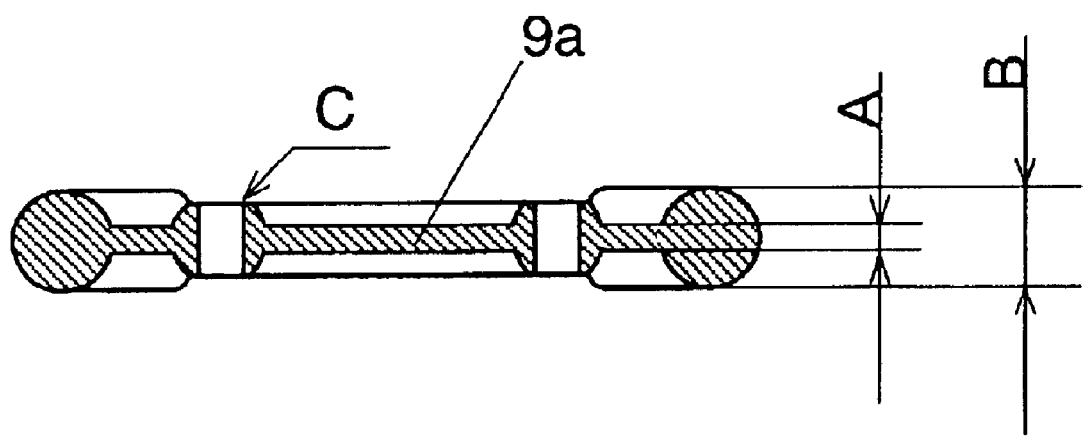
FIG. 7A is a sectional view of a card reader in the second embodiment.
Figure 7B:
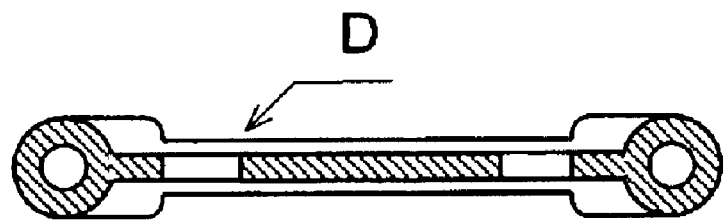
FIG. 7B is a sectional view of an elastic body of the card reader in the second embodiment with parts around magnetic head terminal excluded.

FIG. 4 is an exploded perspective view of a magnetic head mechanism in a second exemplary embodiment of the present invention. FIG. 5 is a sectional view of the mechanism. FIG. 6 is a perspective view of an elastic body. FIG. 7A is a sectional view of the elastic body having a reduced thickness around the magnetic head terminal inserting portion. FIG. 7B is a sectional view of the elastic body with parts around the magnetic head terminal removed.

The card reader in the second embodiment includes, as shown in FIG. 4 and FIG. 5, an elastic body 9 disposed directly on top of a magnetic head 5 instead of a wire spring 6 fitted to a head support member 4 in the first embodiment. The body is shaped in substantially square and a little smaller than the top of magnetic head 5. The card reader includes a reduced number of parts since excluding the head support member in the card reader in the first embodiment. The upper case 1 is provided with a stopper 1d projecting inside the upper end of magnetic head mounting hole 1b. The stopper does not touch the magnetic head terminal. The magnetic head 5 is moved up having side walls guided along side walls of the head mounting hole 1b of the upper case 1. In that case, the elastic body 9 pressed against the stopper 1d generates a force F applied onto the magnetic head due to a repulsion of the elastic body compressed.

Then, if a clearance between the magnetic head 5 and the upper case 1 in the card running direction in the magnetic head mounting hole 1b is excessive, the clearance may cause the magnetic head 5 to be inclined. In that case, azimuth may be generated between the magnetic stripe of magnetic card 12, making the magnetic head 5 to hardly read the data. Therefore, the clearance between the magnetic head 5 and the side wall of the upper case ranges from 0.05 mm to 0.2 mm.

FIG. 6 shows the shape of the elastic body 9. Each of the four corners of elastic body 9 is flexible against vertical movement or rocking motion of the magnetic head 5, and has a solid round shaft shape (FIG. 7A) or hollow circular section shape (FIG. 7B) in order to provide a strong force.

At the elastic body 9, a magnetic head terminal 5a projecting from the magnetic head 5 is inserted into a terminal inserting portion C. In order to prevent the magnetic head terminal 5a from a load applied thereto when the magnetic head 5 makes vertical movement or rocking motion with a card inserted, the body may have a thickness A around the magnetic head terminal 5a less than a peripheral thickness B (FIG. 7A). The body may have a peripheral area D removed where the magnetic head terminal 5a is inserted (FIG. 7B). The body may be made of silicone rubber of hardness of 70 that may withstand temperature alteration.

The above technology of the embodiments is not limited only for the magnetic head support mechanism of an insertion type magnetic card reader, but may be applied to a slide type card reader, a motor-operated card reader.

INDUSTRIAL APPLICABILITY

According to the present invention, a card reader includes an inlet port for accepting s magnetic card, a magnetic card guide formed by an upper case and a lower case for the magnetic card, and a magnetic head for reading data on the magnetic card, which is held between the upper case and the lower case. The card reader is thin and small since including the magnetic head support mechanism accommodated in the upper case.

What is claimed is:

1. A card reader for reading data recorded on a magnetic card inserted therein, comprising:

a first case;

a second case mounted to said first case, for forming, between said first case and said second case, a magnetic card guide for guiding the magnetic card;

a magnetic head held between said first and second cases, for reading the data;

a spring inside said first case for applying a force to said magnetic head when said magnetic card is inserted into said card guide; and first and second grooves inside said first case supporting opposite ends of said spring and defining respective fulcrums for said opposite ends when said card is inserted into the card guide.

2. The card reader of claim 1, wherein said first case has a magnetic head mounting hole for accommodating said magnetic head therein from a side of the second case.

3. A card reader for reading data recorded on a magnetic card inserted therein, said card reader comprising:

a first case having a magnetic head mounting hole formed therein, said magnetic head mounting hole having a side wall, said first case including a stopper projecting from an end of said side wall of said magnetic head mounting hole;

a second case mounted to said first case, for forming a magnetic card guide between said first case and said second case, said magnetic card guide being provided for guiding the magnetic card;

a magnetic head held between said first and second cases, for reading the data, said magnetic head having a portion located in said magnetic head mounting hole; and an elastic body for applying a force to said magnetic head, said elastic body being located between said stopper and said magnetic head, said elastic body contacting said stopper and said magnetic head.

4. The card reader of claim 3, wherein said elastic body is made of hard rubber, and has one of a solid shaft shape and a hollow circular section shape at a rim thereof.

5. The card reader of claim 3, wherein said elastic body has a substantially flat shape.

6. The card reader of claim 3, wherein said magnetic head is movable in a predetermined direction along said side wall of said magnetic head mounting hole and against said side wall of said magnetic head mounting hole.

7. The card reader of claim 6, wherein said magnetic head comprises a magnetic head terminal projecting toward said elastic body.

8. The card reader of claim 7,
wherein said elastic body has a terminal inserting portion as to allow said magnetic head terminal to be inserted into said terminal inserting portion, and
wherein said elastic body has a peripheral thickness in said predetermined direction and a thickness around said terminal inserting portion of said elastic body in said predetermined direction, said thickness around said terminal inserting portion being smaller than said peripheral thickness of said elastic body.

9. The card reader of claim 3,
wherein said magnetic head has a first surface arranged to contact said magnetic card and has a second surface opposite to said first surface of said magnetic head, and
wherein said elastic body contacts said second surface of said magnetic head.

* * * * *